Oct. 14, 1930.    T. R. McGOWAN    1,778,118
BRAKE HEAD CONNECTION
Filed Nov. 28, 1928
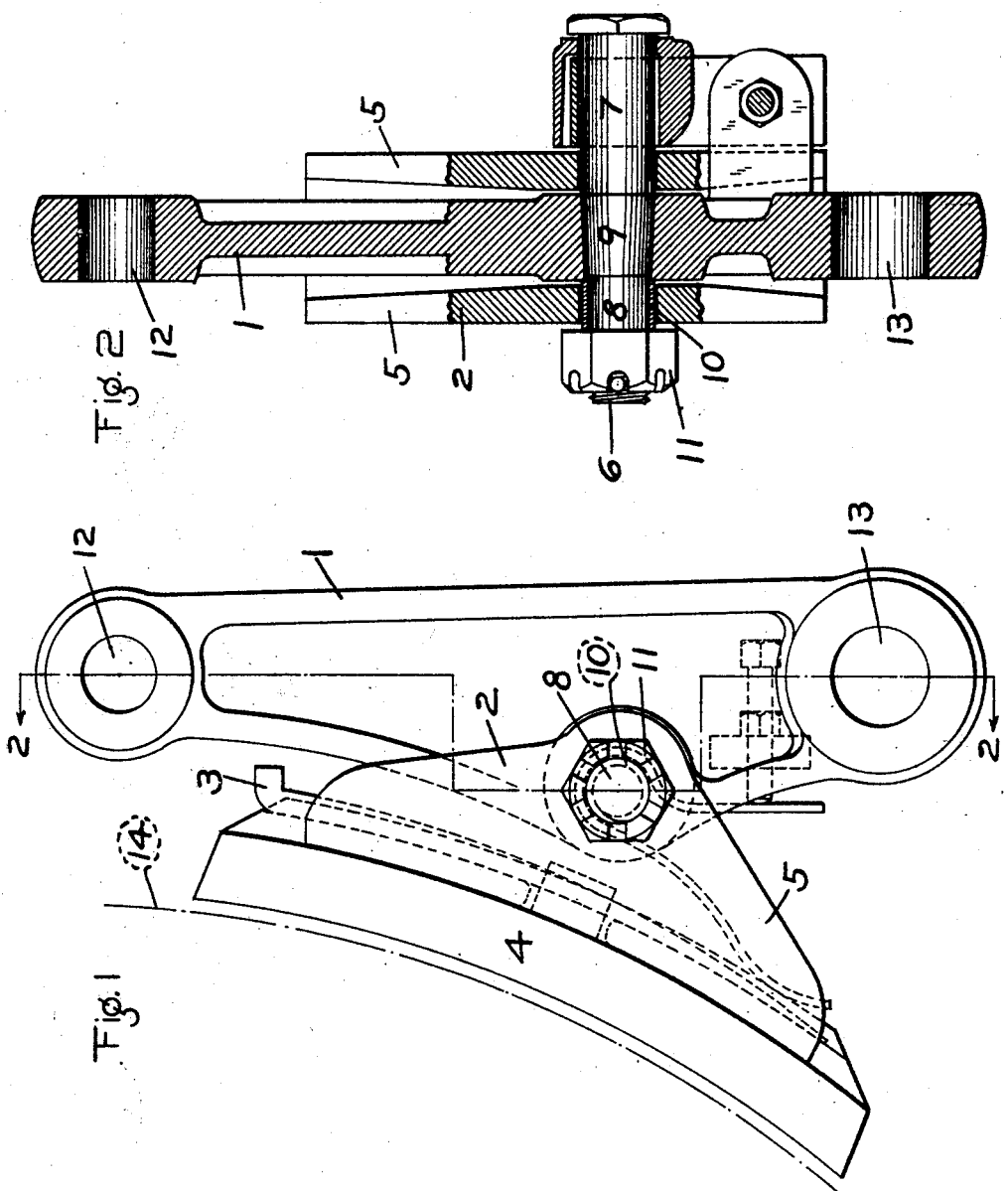
INVENTOR
THOMAS R. McGOWAN
BY *Wm. M. Cady*
ATTORNEY

UNITED STATES PATENT OFFICE

THOMAS R. McGOWAN, OF ST. LOUIS, MISSOURI, ASSIGNOR TO THE AMERICAN BRAKE COMPANY, OF ST. LOUIS, MISSOURI, A CORPORATION OF MISSOURI

BREAK-HEAD CONNECTION

Application filed November 28, 1928. Serial No. 322,380.

This invention relates to vehicle brakes and more particularly to railway locomotive and car brakes and has for its principal object to provide a novel connection between a brake lever and a brake shoe head which will prevent undesirable brake shoe chatter.

In some types of brake riggings, the brake shoe heads are connected directly to the brake levers by pins which pass through registering openings formed in the levers and heads. Heretofore it has been the practice to employ a pin having the same diameter throughout its length, except for its head, and has been made to fit in the openings in the brake shoe head and lever in such a manner that there will be relative movement between the pin and lever, and between the pin and brake shoe head, and since this relative movement is permitted, the openings in the lever and brake shoe head, through which the pin passes, will, due to wear, be increased in diameter. When these openings are thus increased in diameter, the lever will engage the pin on one side and the break shoe head will engage the pin on the opposite side when the brake shoes are applied to the tread of the vehicle wheel, and it has been found that, since the pin is loose relative to the head and the lever, the action of the brake shoe head, when the brake is being applied or released, will cause a hammer-like action to occur between the brake shoe head and pin and between the brake lever and the pin, which causes an undesirable noise known as brake shoe chatter and also causes excessive and rapid wear of the pin, head and lever.

Another object of my invention is to provide a brake construction which will prevent any wear between the brake lever and the brake pin and thus eliminate the above objectionable features.

Other objects and advantages will appear in the following more detailed description of the invention.

In the accompanying drawing; Fig. 1 is a side elevational view of a portion of a brake rigging embodying my invention; and Fig. 2 is a sectional view of the same taken on the line 2—2 of Fig. 1.

Referring now in detail to the drawing, the reference character 1 indicates a brake lever of the hanger type which is commonly employed in locomotive brake construction, and the reference character 2 indicates a brake shoe head which is carried by the lever 1. Secured to this head by a key 3 is a brake shoe 4 adapted to be moved into and out of frictional engagement with the tread of a wheel 14.

The brake shoe head 2 is provided with spaced rearwardly extending flanges 5 which overlap the sides of the lever 1, and to mount the brake shoe head on the lever, a pin 6 is passed through openings formed in the flanges 5 and lever 1.

The pin 6 has a headed end portion 7 which is preferably of the same diameter as the pin commonly used, a threaded end portion 8 of less diameter than that of the end portion 7, and an intermediate portion 9 which tapers from its greatest diameter adjacent the end portion 7 to its least diameter adjacent the end portion 8.

One of the flanges 5 of the brake shoe head is in direct contact with the end portion 7 of the pin 6 while the other flange 5 contacts with a bushing 10 mounted on the end portion 8 of the pin, the outside diameter of which bushing is substantially the same diameter as the end portion 7 of the pin.

This bushing is of greater length than the thickness of the flange 5 through which it passes, and at its inner end engages one side of the lever 1. The outer end of the bushing is engaged by a nut 11 which is screwed on the threaded end portion 8 of the pin 6.

The opening in lever 1, for the reception of the pin 6, is shaped to conform to the shape of the intermediate portion 9 of the pin 6, so that when the nut 11 is tightened against the bushing 10, there will be a wedging action take place between the portion 9 of the pin and the lever 1, and due to this, the pin and lever will be rigidly connected together.

It will be understood that while relative movement between the lever 1 and pin 6 is not permitted, free movement of the brake shoe head relative to the pin and bushing 10 is permitted.

When the openings in the flanges 5 become enlarged, due to wear, the pin 6, which is rigidly secured to the lever 1 will, when the brakes are being applied and released, engage the flanges 5, and since there is no looseness of the pin relative to the lever, no hammer action can occur, thus preventing objectionable chatter.

As shown in the drawing, the upper end of the lever 1 has an opening 12 adapted to receive a pivot member which may be mounted in the usual manner on the frame of the locomotive (not shown). The lower end of the lever has an opening 13 adapted to receive one end of the usual brake beam (not shown).

While I have described my invention in connection with a hanger lever, it will be understood that it may be used with any type of brake lever having the brake shoe head carried directly thereby.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. The combination with a brake lever, of a brake shoe head, a pin operatively connecting said lever and head, and wedge means for rigidly securing said pin to said lever.

2. The combination with a brake lever, of a brake shoe head, a pin operatively connecting said lever and head, and cooperating wedge means on said pin and lever for rigidly securing said pin to said lever.

3. The combination with a brake lever and a brake shoe head, of a pin operatively connecting said lever and head and having a tapered portion, a bushing surrounding one end of said pin engaging one side of said lever, and a nut on said pin adapted to engage said bushing to draw said lever and tapered portion of the pin into close engagement with each other.

4. The combination with a brake lever, of a brake shoe head, a pin having end portions extending through said head and a wedge shaped portion extending into said lever, a bushing on one of said end portions of the pin and engaging one side of said lever, and means engaging said bushing and pin for causing the wedge shaped portion of said pin to closely engage said lever.

In testimony whereof I have hereunto set my hand, this 23rd day of November, 1928.

THOMAS R. McGOWAN.